US010739112B1

(12) United States Patent
Renn et al.

(10) Patent No.: US 10,739,112 B1
(45) Date of Patent: Aug. 11, 2020

(54) IMPULSE DAMPENING SYSTEM FOR EMERGENCY EGRESS

(71) Applicant: The United States of America as represented by the Secretary of the Navy, Indian Head, MD (US)

(72) Inventors: Philip Alan Renn, La Plata, MD (US); Edward Aloysius Cudahy, IV, Monroe, GA (US); Michael Kaige Qin, Ledyard, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1166 days.

(21) Appl. No.: 13/987,620

(22) Filed: Aug. 15, 2013

(51) Int. Cl.
*B64C 1/32* (2006.01)
*F41H 5/04* (2006.01)
*B64C 1/14* (2006.01)

(52) U.S. Cl.
CPC .......... *F41H 5/0442* (2013.01); *B64C 1/14* (2013.01); *B64C 1/32* (2013.01); *F41H 5/04* (2013.01); *B64C 1/1476* (2013.01)

(58) Field of Classification Search
CPC . F41H 5/0442; F41H 5/04; B64C 1/12; B64C 1/14; B64C 1/40; B64C 1/32; B64D 25/00; C06C 5/00; C06C 5/04; F42D 5/045
USPC ................ 102/275.12, 275.2, 275.4, 275.7
See application file for complete search history.

(56) References Cited

U.S. PATENT DOCUMENTS

| | | | | |
|---|---|---|---|---|
| 3,248,072 A * | 4/1966 | Schimmel | ................. | B64C 1/32 102/307 |
| 3,486,410 A * | 12/1969 | Lake | ....................... | F42B 15/38 102/275.4 |
| 3,598,692 A * | 8/1971 | Gardner, Jr. | ............ | B32B 27/00 428/520 |
| 3,658,006 A * | 4/1972 | Nistler | ..................... | F42B 3/08 102/307 |
| 3,782,284 A * | 1/1974 | Gibb | ......................... | B64C 1/32 102/275.8 |
| 3,894,169 A * | 7/1975 | Miller | ....................... | E04B 1/82 181/207 |
| 3,919,939 A * | 11/1975 | Murray | ..................... | B64C 1/32 102/307 |

(Continued)

OTHER PUBLICATIONS

Acoustics: The speed and attenuation of sound http://www.kayelaby.npl.co.uk.

(Continued)

*Primary Examiner* — Tien Q Dinh
*Assistant Examiner* — Michael A. Fabula
(74) *Attorney, Agent, or Firm* — Fredric J. Zimmerman

(57) ABSTRACT

An impulse dampening system reduces peak pressure and impulse acoustic pressures of an acoustic wave to a level that permits initiation of an emergency egress system by personnel in a submerged/flooded cockpit following landing or crashing into water. Initiation of the emergency egress system is available in the air or after the aircraft is in the water. The system attenuates the impulse of the acoustic wave at least 35 dB, where the acoustic wave is usually produced when a detonation chord is initiated. The system includes a first layer of dampening media, a second layer of dampening media, a viscous lensing medium between the layers, and a hard shell.

16 Claims, 8 Drawing Sheets

(56) References Cited

U.S. PATENT DOCUMENTS

| | | | | |
|---|---|---|---|---|
| 4,090,447 A * | 5/1978 | Johnsen | ............ | F42B 3/08 102/313 |
| 4,301,707 A * | 11/1981 | Schimmel | ............ | B26F 3/04 244/122 AF |
| 4,407,468 A * | 10/1983 | Bement | ............ | B26F 3/04 102/378 |
| 4,649,795 A * | 3/1987 | Olander | ............ | B64D 1/12 244/121 |
| 4,649,825 A * | 3/1987 | Quick | ............ | F42B 15/38 102/307 |
| 4,978,089 A * | 12/1990 | Alquier | ............ | B64C 1/32 102/223 |
| 5,022,307 A * | 6/1991 | Gibbons, Jr. | ............ | B32B 7/02 89/34 |
| 5,275,361 A * | 1/1994 | Fray | ............ | B64C 1/00 244/118.1 |
| 5,400,296 A * | 3/1995 | Cushman | ............ | G10K 11/165 181/284 |
| 5,534,343 A * | 7/1996 | Landi | ............ | D03D 11/00 2/2.5 |
| 5,826,824 A * | 10/1998 | Martin | ............ | B64C 1/32 244/129.3 |
| 5,954,296 A * | 9/1999 | Jahsman | ............ | B64C 1/32 244/121 |
| 6,174,587 B1 * | 1/2001 | Figge, Sr. | ............ | B32B 5/18 181/290 |
| 6,286,430 B1 * | 9/2001 | Salort | ............ | F42B 15/38 102/312 |
| 6,289,816 B1 * | 9/2001 | Keenan | ............ | F42B 39/16 102/303 |
| 6,298,786 B1 * | 10/2001 | Grosskrueger | ............ | B64G 1/641 102/377 |
| 6,598,547 B1 * | 7/2003 | Marold | ............ | B01J 8/12 110/237 |
| 6,609,464 B1 * | 8/2003 | Hilden | ............ | B26F 3/04 102/306 |
| 7,762,375 B2 * | 7/2010 | Matsuyama | ............ | B60R 13/083 181/286 |
| 8,006,621 B1 * | 8/2011 | Cherry | ............ | B26F 3/04 102/307 |
| 2007/0006723 A1 * | 1/2007 | Waddell, Jr. | ............ | F42D 5/05 89/36.02 |
| 2010/0206159 A1 * | 8/2010 | Wang | ............ | B32B 5/26 89/36.02 |
| 2011/0107904 A1 * | 5/2011 | Queheillalt | ............ | F41H 5/023 89/36.02 |
| 2011/0167994 A1 * | 7/2011 | Au-Yeung | ............ | B64C 1/1492 89/1.14 |
| 2012/0204329 A1 * | 8/2012 | Faden | ............ | A41D 31/005 2/413 |
| 2014/0137726 A1 * | 5/2014 | Wagner | ............ | F42D 5/045 89/36.02 |

OTHER PUBLICATIONS

Canopy Hatch Explosions http://navyaviation.tpub.com.
Wave Reflection http://www.sal2000.com/ds/ds3/acoustics/wave%20reflections.htm.

* cited by examiner

TABLE 1

| Materials | Longitudinal Velocity cm/μs | Shear Velocity cm/μs | Surface Velocity cm/μs | Density Density g/cm3 | Acoustic Impedance z (Rayl) |
|---|---|---|---|---|---|
| Air: | | | | | 415 |
| Aluminum | 0.632 | 0.313 | N/A | 2.7 | 17,100,000 |
| Babbitt | 0.23 | N/A | N/A | 7.4 -11.0 | 23,200,000 |
| Beryllium | 1.29 | 0.888 | 0.787 | 1.82 | 23,500,000 |
| Bismuth | 0.218 | 0.11 | N/A | 9.8 | 21,400,000 |
| Brass | 0.428 | 0.23 | N/A | 8.56 | 36,700,000 |
| Brass, Half Hard | 0.383 | 0.205 | N/A | 8.1 | 31,020,000 |
| Brass, Naval | 0.443 | 0.212 | 0.195 | 8.42 | 37,300,000 |
| Brass: | | | | | 40 000 000 |
| Bronze, Phospho | 0.353 | 0.223 | 0.201 | 8.86 | 31,280,000 |
| Cadmium | 0.278 | 0.15 | N/A | 8.64 | 24,020,000 |
| Cesium (28.5oC) | 0.0967 | N/A | N/A | 1.88 | 1,820,000 |
| Clay: | | | | | 7 700 000 |
| Columbium | 0.492 | 0.21 | N/A | 8.57 | 42,160,000 |
| Concrete: | | | | | 8 000 000 |
| Constantan | 0.524 | 0.104 | N/A | 8.88 | 46,530,000 |
| Copper | 0.466 | 0.233 | 0.193 | 8.93 | 41,610,000 |
| Fresh water: | | | | | 1 480 000 |
| Gallium | 0.274 | N/A | N/A | 5.95 | 16,300,000 |
| Germanium | 0.541 | N/A | N/A | 5.47 | 29,590,000 |
| Gold | 0.324 | 0.12 | N/A | 19.32 | 62,600,000 |
| Granite: | | | | | 16 000 000 |
| Hafnium | 0.384 | N/A | N/A | N/A | N/A |
| Inconel | 0.572 | N/A | 0.279 | 8.25 | 47,190,000 |
| Indium | 0.222 | N/A | N/A | 7.3 | 16,210,000 |
| Iron | 0.59 | 0.323 | 0.279 | 7.7 | 45,430,000 |
| Iron, Cast | 0.48 | 0.24 | N/A | 7.8 | 37,440,000 |
| Lead | 0.216 | 0.07 | 0.063 | 11.4 | 24,620,000 |
| Lead 5% Antinomy | 0.217 | 0.081 | 0.074 | 1.9 | 23,650,000 |
| Magnesium | 0.631 | N/A | N/A | 1.74 | 10,980,000 |
| Magnesium (AM-35) | 0.579 | 0.31 | 0.287 | 1.74 | 10,070,000 |
| Magnesium (O-1) | 0.58 | 0.304 | N/A | 1.82 | 10,560,000 |

*FIG. 6a*

TABLE 1

| | | | | | |
|---|---|---|---|---|---|
| Magnesium (ZK-60A-TS) | 0.571 | 0.305 | N/A | 1.83 | 10,450,000 |
| Manganese | 0.466 | 0.235 | N/A | 7.39 | 34,440,000 |
| Molybdenum | 0.629 | 0.335 | 0.311 | 10.2 | 64,160,000 |
| Monel | 0.602 | 0.272 | 0.196 | 8.83 | 53,160,000 |
| Nickel | 0.563 | 0.296 | 0.264 | 8.88 | 49,990,000 |
| Platinum | 0.396 | 0.167 | N/A | 21.4 | 84,740,000 |
| Plutonium | 0.179 | N/A | N/A | N/A | 28,200,000 |
| Plutonium (1% Gallium) | 0.182 | N/A | N/A | N/A | 28,600,000 |
| Potassium (100oC) | 0.182 | N/A | N/A | 0.83 | 1,510,000 |
| Quartz: | | | | | 15 300 000 |
| Radium | 0.0822 | 0.111 | 0.103 | 5 | 4,110,000 |
| Rubber: | | | | | 1,810,000 |
| Rubidium | 0.126 | N/A | N/A | 1.53 | 1,930,000 |
| Salt water: | | | | | 1,540,000 |
| Sandstone: | | | | | 7 700 000 |
| Silver | 0.36 | 0.159 | N/A | 10.5 | 37,800,000 |
| Silver, German | 0.476 | N/A | N/A | 8.7 | 41,410,000 |
| Silver, Nickel | 0.462 | 0.232 | 0.169 | 8.75 | 40,430,000 |
| Steel, 1020 | 0.589 | 0.324 | N/A | 7.71 | 45,410,000 |
| Steel, 1095 | 0.59 | 0.319 | N/A | 7.8 | 46,020,000 |
| Steel, 302 Cres | 0.566 | 0.312 | 0.312 | 8.03 | 45,450,000 |
| Steel, 347 Cres | 0.574 | 0.309 | N/A | 7.91 | 45,400,000 |
| Steel, 410 Cres | 0.539 | 0.299 | 0.216 | 7.67 | 56,680,000 |
| Steel, 4150, Rc14 | 0.586 | 0.279 | N/A | 7.84 | 45,940,000 |
| Steel, 4150, Rc18 | 0.589 | 0.318 | N/A | 7.82 | 46,060,000 |
| Steel, 4340 | 0.585 | 0.319 | N/A | 7.8 | 45,630,000 |
| Steel: | | | | | 47 000 000 |
| Tantalum | 0.41 | 0.114 | N/A | 16.6 | 68,060,000 |
| Thallium (302oC) | 0.162 | N/A | N/A | 11.9 | 19,280,000 |
| Thorium | 0.24 | 0.156 | N/A | 11.3 | 27,120,000 |
| Tin | 0.332 | 0.167 | N/A | 7.29 | 24,200,000 |
| Titanium | 0.607 | 0.331 | N/A | 4.5 | 27,320,000 |
| Titanium Carbide | 0.827 | 0.516 | N/A | 5.15 | 42,590,000 |
| Tungsten | 0.518 | 0.287 | 0.265 | 19.25 | 99,720,000 |

*FIG. 6b*

TABLE 1

| | | | | | |
|---|---|---|---|---|---|
| Uranium | 0.338 | 0.196 | N/A | 18.9 | 63,880,000 |
| Uranium Dioxide | 0.518 | N/A | N/A | 6.03 | 31,240,000 |
| Vanadium | 0.6 | 0.278 | N/A | 6.03 | 36,180,000 |
| water (fresh) | | | | | 1 480 000 |
| Wet fish bone: | | | | | 2 500 000 |
| Wet fish flesh: | | | | | 1 600 000 |
| Zinc | 0.417 | 0.241 | N/A | 7.1 | 29,610,000 |
| Zircaloy | 0.472 | 0.236 | N/A | 9.03 | 42,600,000 |
| Zirconium | 0.465 | 0.222 | N/A | 6.48 | 30,100,000 |

*FIG. 6c*

TABLE 2

|  | Transmitted amt. | power loss | Power left | Attenuation Cumulative | Change in Power | dB Difference |
|---|---|---|---|---|---|---|
| Initial Wave | 100% |  |  |  |  |  |
| Interface of retainer and 1st layer | 70.0% | 30.0% | 0.700000 | 1.5490 | 0.30000 | 1.5490 |
| 1st layer | 25.0% | 80.0% | 0.140000 | 8.5387 | 0.56000 | 6.9897 |
| Interface of 1st layer and Viscous layer | 80.0% | 20.0% | 0.112000 | 9.5078 | 0.02800 | 0.9691 |
| Viscous layer | 75.0% | 80.0% | 0.022400 | 16.4975 | 0.08960 | 6.9897 |
| Interface of 2nd layer and Viscous layer | 80.0% | 20.0% | 0.017920 | 17.4666 | 0.00448 | 0.9691 |
| 2nd layer | 60.0% | 60.0% | 0.007168 | 21.4460 | 0.01075 | 3.9794 |
| Interface of Hardshell and 2nd layer | 5.3% | 94.7% | 0.000380 | 34.2033 | 0.00679 | 12.7572 |
| Hard shell to aircraft wall | 10.0% | 10.0% | 0.000342 | 34.6608 | 0.00004 | 0.4576 |
| Hard Shell to water in aircraft | 2.0% | 5.0% | 0.000325 | 34.8836 | 0.00002 | 0.2228 |
| Total Attenuation |  |  | 34.884 |  |  | 34.884 |

*FIG. 7*

TABLE 3

Speed of sound in air ~343 m/s. Speed in water is 1,433 m/s

| Medium | Velocity (m/s) | (ft/s) |
| --- | --- | --- |
| Aluminum | 6420 | 21063 |
| Brass | 3475 | 11400 |
| Brick | 4176 | 13700 |
| Concrete | 3200 - 3600 | 10500 - 11800 |
| Copper | 3901 | 12800 |
| Cork | 366 - 518 | 1200 - 1700 |
| Diamond | 12000 | 39400 |
| Glass | 3962 | 13000 |
| Glass, Pyrex | 5640 | 18500 |
| Gold | 3240 | 10630 |
| Hardwood | 3962 | 13000 |
| Iron | 5130 | 16830 |
| Lead | 1158 | 3800 |
| Lucite | 2680 | 8790 |
| Rubber | 40 - 150 | 130 - 492 |
| Steel | 6100 | 20000 |
| Water | 1433 | 4700 |
| Wood (hard) | 3960 | 13000 |
| Wood | 3300 - 3600 | 10820 - 11810 |

*FIG. 8*

IMPULSE DAMPENING SYSTEM FOR EMERGENCY EGRESS

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The invention relates generally to emergency egress systems that utilize energetic materials to provide an emergency opening. More particularly, the invention is an impulse dampening system that dampens the impulse produced by the energetic materials to a level that is not lethal, even when actuated in aircraft that are submerged or flooded.

2. Background

The probable survivability of personnel in an aircraft, such as a helicopter, that have undergone a hard landing is greatly improved when there is an emergency egress system. Many of these egress systems use explosive charges such as a SMDC (shielded mild detonating chord), MDC (Mild Detonating Chord), FLSC (Flexible Linear Shape Charge) or a FCDC (flexible confined detonating chord). The detonating chord is in a fillet retainer that substantially borders the periphery of a severable element, for example a severed door, hatch or a frangible wall such as a canopy. The detonating chord is seated in a an appropriate chord cross-sectional shaped groove in an elongate rubber element housed-by and filling an elongate charge holder, where the charge holder is a semi-cylindrical-like component of the elongate retainer. The rubber element may have voids into which the rubber may distend when compressed. The retainer has historically been made of a structural composite, such as fiberglass. In cases where the detonating chord is insufficient to sever the severable element, then a booster charge may be employed. The explosive booster charge is typically used to initiate the detonating cord.

The previously described emergency egress system produces an impulse, which while loud, is usually not injurious to personnel in the aircraft when initiated while airborne or on the ground. However, the same emergency egress system is lethal to personnel who are partially or completely submerged in water when the system is initiated. This difference in response is because humans are about 68% water, and they have an acoustic impedance that is very similar to water. A human's body will absorb the water borne impulse produced by the emergency egress explosive charge, but humans have an acoustic impedance mismatch with an air borne impulse. The air borne impulse is largely reflected. Therefore, their body only absorbs a small fraction of the impulse. When the water borne impulse is absorbed by humans, substantially unattenuated, it causes devastating damage to internal organs, typically resulting in death. An emergency egress system without this potential lethal limitation would have military and civilian advantages.

SUMMARY OF THE INVENTION

The invention in one aspect is an impulse dampening system that reduces peak pressure and impulse acoustic pressures of an acoustic wave to a level that permits initiation of an emergency egress system by personnel in a submerged/flooded cockpit following landing or crashing into water, where initiation of the emergency egress system may be in the air or after the aircraft is in the water. The impulse dampening system attenuates the impulse of the acoustic wave at least 35 dB, where the acoustic wave is usually produced when a detonation chord is initiated. The impulse dampening system includes a first layer of dampening media, a second layer of dampening media, a viscous lensing medium between the layers, and a hard shell. Generally, a conventional energetic material emergency egress system has a fiberglass retainer having a semi-cylindrical trough with a rubber charge holder, where the retainer is mounted in the aircraft facing the severable element that is severed. The rubber charge holder has a groove with a detonation chord, which is proximate to an internal surface of the severable element that is severed by the explosion.

The layers of multiple media of the impulse dampening system are selected to have differing characteristic acoustic impedance materials that attenuate the acoustic wave, converting much of the impulse into heat as a consequence of friction. The viscous lensing medium between the first and second layers tends to provide low angle incident waves. These acoustic waves are more likely to be transmitted and absorbed by one of the media layers. An exception occurs if the incident angle is too high, then the incident wave is reflected and the reflected acoustic wave travels longitudinally, circulating through the viscous lensing medium, dissipating energy as heat to the viscous lensing medium. The viscous lensing medium is selected so that it can absorb a substantial amount of energy without boiling. The outer hard shell protects the softer elements of the impulse dampening system from incidental combat, hazardous failures, and the hard shell functions as a supporting element for the softer elements. Generally, the hard shell is composed of stainless steel, which has a very high acoustic impedance, (hundreds of times higher than seawater and rubber). Therefore, when using stainless steel at the interface of the hard shell and the second layer, the acoustic wave is reflected because there is an impedance mismatch, and the energy of the incident acoustic wave is reflected back into the second layer.

An aspect of the impulse dampening system is that the hard shell and layers of the impulse dampening system are so dimensioned that it overlaps and encloses the fiberglass retainer of the emergency egress system. Therefore, this configuration enables the possibility of both retrofitting and incremental fitting of the impulse dampening system onto the retainer of the emergency egress.

The specific geometry of the impulse dampening system contributes to the attenuation of the acoustic wave. The first layer lengthwise is elongate and widthwise it is crescent shaped. It is mounted in contact with an opposing side of the semi-cylindrical trough that is filled with the rubber charge holder of the emergency egress system. The widthwise crescent shape of the first layer has a smaller radius than the second layer, and it has a greater curvature than the second layer. The greater curvature of the first layer tends to fan out an acoustic wave dispersing the energy as a transmitted wave into the viscous lensing medium. A returning transmitted wave emanating as an incident wave from the viscous lensing medium is more likely- to be reflected from the curved surface of the first layer. A wave impinging the inside curvature of the second layer is more likely to be transmitted as the incident angle is closer to normal. If the angle is too large to be refracted, then the reflected wave will impinge an interface nearby and be transmitted into the second layer.

Lengthwise, there is no curvature, and acoustic waves moving lengthwise will either be transmitted or internally reflected. Internal reflection is likely to occur, predominately, in the lensing medium because a wave can travel further before impinging either the first layer or the second layer. Further, the lensing medium generally does not have any particulates. This feature is advantageous because it draws out the conversion to heat, as the acoustic wave in essence will circulate through the lensing medium and the extension of time increases the possibility for destruction interference.

Another aspect of the invention is that it confines most of the acoustic wave within the hard shell where the layers of multiple media contain particulates that absorb and reflect acoustic waves, converting the energy of the waves into heat. The invention provides a mechanism for localizing the impulse within the impulse dampening system, and extending the time for the conversion of acoustic waves into heat. Accordingly, there is not enough heat to form fires or toxic fumes. The net effect of the invention is an efficient impulse dampening system with a safe distribution of the resulting heat and an acceptable level of usage of space and only an incremental increase in weight.

BRIEF DESCRIPTION OF THE DRAWINGS

The foregoing invention will become readily apparent by referring to the following detailed description and the appended drawings in which:

FIGS. 6a, 6b and 6c include Table 1, which is a partial compilation of impedance parameters for a variety of materials that can be included in the impulse dampening system;

FIG. 7 includes Table 2, which is a breakdown of the estimated attenuation of the impulse of the acoustic wave as it moves through an embodiment of the impulse dampening system; and FIG. 8 includes Table 3, which is a partial compilation of the speed of sound for a variety of materials that can be included in the impulse dampening system.

DETAILED DESCRIPTION OF THE INVENTION

The exemplary embodiment of the invention is an impulse dampening system that reduces peak pressure and impulse acoustic pressures of acoustic waves to a level that permits personnel to initiate an emergency egress system while in a submerged/flooded cockpit following landing or crashing into water. Initiation of the emergency egress system may be in the air or after the aircraft is in the water. The impulse dampening system attenuates the impulse at least 35 dB over and above emergency egress systems that utilize explosive charges to remove, quickly, severable elements.

The impulse dampening system includes the softer elements of a first layer of dampening media, a viscous lensing medium, and a second layer of dampening media. The softer elements are mounted in an outer hard shell, where the outer shell has at least one section that is semi-cylindrical. The outer hard shell supports and protects the softer elements of the impulse dampening system from incidental combat, hazardous failures, and the hard shell functions as a supporting element for the softer elements. The viscous lensing medium is located between the first layer and the second layer. The second layer is mounted to an interior surface of the semi-cylindrical section of the hard shell. The impulse dampening system overlaps and encloses the retainer of the emergency egress system. For example, in cases where the emergency egress system severs a rectangular hatch by blowing off perimeter fastening elements that hold the rectangular hatch, then superimposed over the retainer housing the emergency egress system's detonation chord is the impulse dampening system. The impulse dampening system overlaps the explosive elements of the emergency egress system. Generally, command and control elements like handles, wiring, and safety devices are not fitted with the impulse dampening system. The impulse dampening system is largely low maintenance and unobtrusive.

Figure 2:
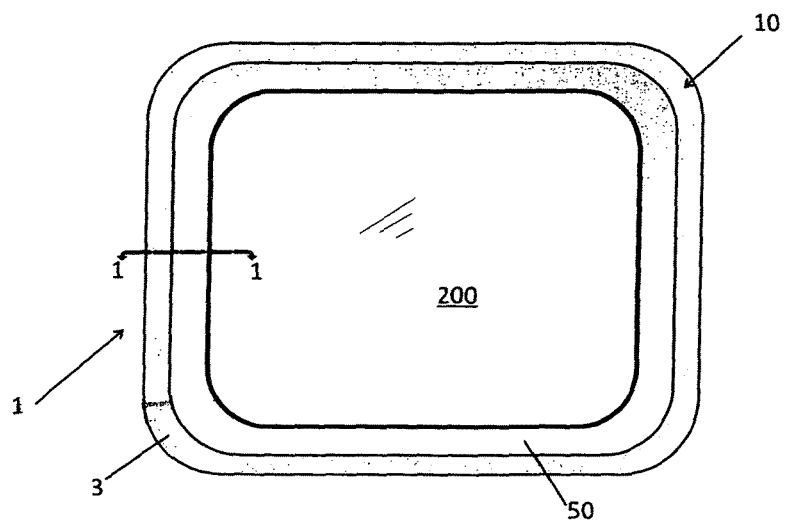
FIG. 2 is a plan view of the impulse dampening system fitted on an emergency egress system.
Figure 1:
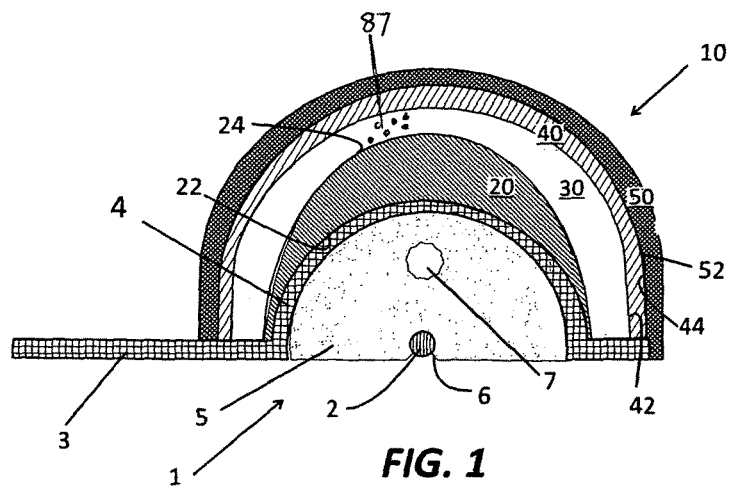
FIG. 1 is a widthwise cross-sectional view taken along section line 1-1 of an embodiment of the invented impulse dampening system fitted on an emergency egress system.

Referring to FIG. 1, which is a widthwise cross-sectional view of an impulse dampening system 10 taken along sectional line 1-1 of FIG. 2, the impulse dampening system is fitted on an energetic emergency egress system 1. The first layer of dampening media 20 is widthwise crescent and lengthwise elongate extending into the plane of the paper. The first layer of dampening media 20 overlaps, and is in contact with an outside of the semi-cylindrical trough 4 of the emergency egress system 1. The semi-cylindrical trough 4 is generally substantially filled with a rubber charge holder 5, where the rubber charge holder has a groove 6 to shape and hold the charge. The illustrated charge is a detonation chord 2. The rubber in the rubber charge holder may have air bubbles 7 or a tube with a gas.

Figure 3:
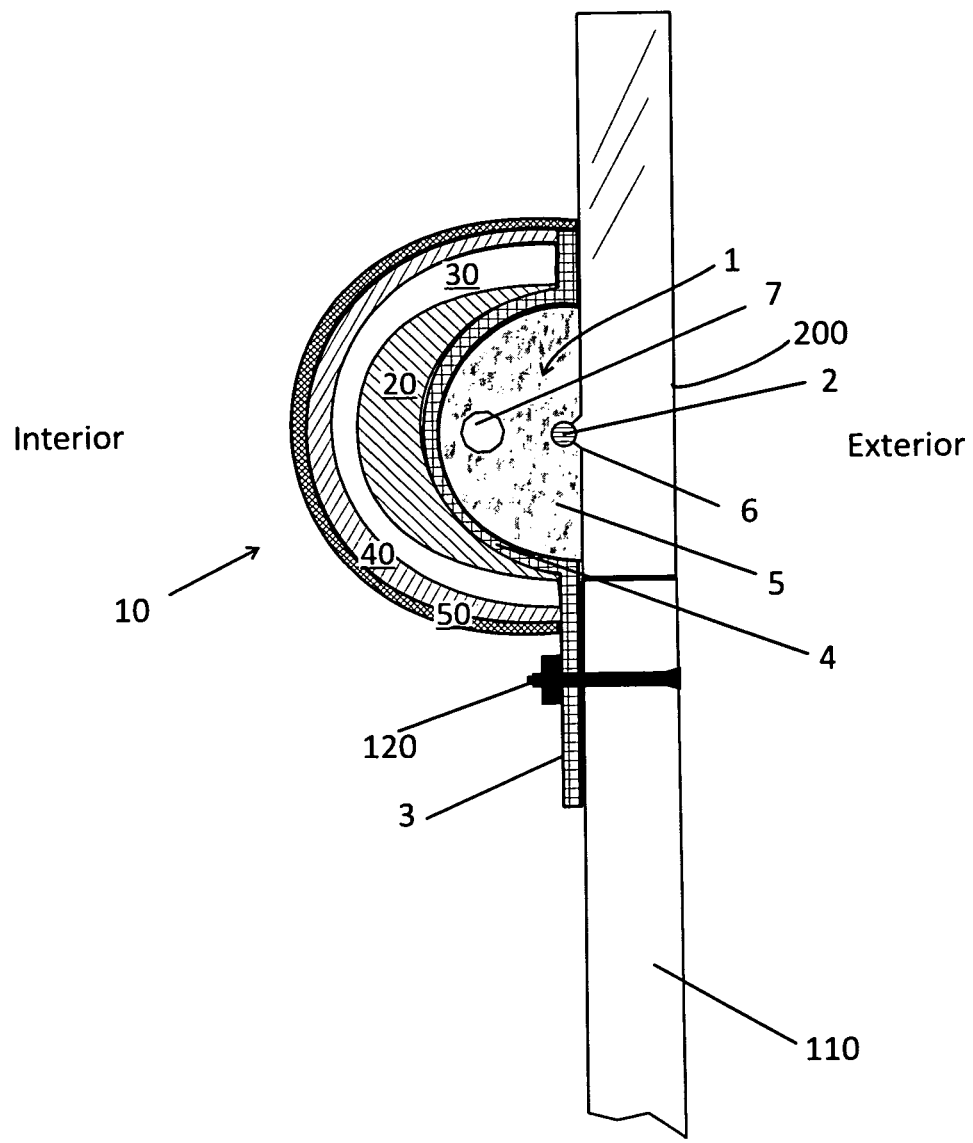
FIG. 3 is a widthwise cross-sectional view of an invented impulse dampening system fitted on an emergency egress system, wherein the emergency egress system is fastened to an wall of an aircraft and positioned over a transparent severable element.

A plan view of the emergency egress system 1 fitted with an impulse dampening system 10 is illustrated in FIG. 2. A severable element 200 is exemplified as a hatch, a door, a cockpit cover, or any other severable element that is severed when the emergency egress system 1 is actuated. The emergency egress system 1 has a retainer 3 that is used in-part to fasten emergency egress system to a wall of the aircraft and to position the charge, a detonation chord 2 (see FIG. 1) and other elements, as enumerated in FIG. 1, over the severable element 200. As shown is the hard shell 50 of the impulse dampening system 10. In FIG. 3, the wall 110 is the skin of an aircraft, and the severable element 200 is a hatch. The emergency egress system 1 fitted with an impulse dampening system 10 is fastened by a bolt 120 extending from the wall 110 through the retainer 3.

The first layer 20 has a composition that includes a polymeric rubbery material containing a high acoustic impedance particulate, where the high acoustic impedance particulate is dispersed in the polymeric rubbery material. The particulate provides multiple internal interfaces, and therein the possibility for multiple reflections of the acoustic wave moving within the filled rubbery material. The high acoustic impedance particulate is selected in part to have an acoustic impedance that is at least partially absorptive. For purposes of this invention, a high acoustic impedance is defined as having an impedance that is greater than 1,540,000 Rayl, which is the acoustic impedance of salt water. A Rayl is $Kg/m^2$-sec. The high acoustic impedance particulate may have a range of multiple sizes and shapes including for example: small flakes, small porous sintered grains, small pastilles, spheres, fines, small granules, or powders. The high acoustic impedance particulate is generally composed of a metal or/and a metal alloy. Table in FIG. 6 is a partial list of materials and impedances in various units. Exemplary metals include lead (~24,620,000 Rayl), aluminum (~17,000,000 Rayl), tungsten (~99,720,000) and exemplary alloys are a stainless steel, for instance SS 410 Cres (~56,680,000 Rayl) and a brass (~40,000,000 Rayl). As previously noted, the crescent shaped first layer 20 of dampening media is substantially flush with the outside wall of the semi-cylindrical retainer trough 4 (which is usually made of fiberglass, and sometimes referred to as a cup), which houses the elongate rubber charge holder 5 of an emergency egress system 1. Generally, the rubber charge holder 5 is composed of a silicone rubber, such as a Dow Corning's RTV®. A similar rubber material is also suitable for a polymeric rubbery material for the elongate crescent first layer of dampening media. Another example of a suitable polymeric rubbery material is a polyurethane rubber based on an oligomer of polyisobutylene having 2-3 reactive sites. The acoustic impedance of the polymeric rubbery material is on the order of ~1,810,000 Rayl, which is comparable to seawater, which is ~1,540,000 Rayl.

In general, the closer the impedance of the medium conveying the acoustic wave (in this case the polymeric rubbery material) is with the interfacing filler material, then the higher the percent of the transmitted wave into the interfacing filler material, and the lower the percent of the reflected wave. Also, in general, a rougher surface promotes refraction and a softer surface is more absorptive. Transmission is possible when the incident angle is not so much greater than normal (perpendicular) that the incident wave just glances off the interface. Therefore, assuming that the acoustic wave originates from the same point, the shape of the surface may influence whether the acoustic wave is transmitted or reflected, and what percent. On the other hand, if there is a large difference in impedance between the media then they have mismatching impedances, and the acoustic is largely reflected and usually less attenuation. If the reflected wave is reflected to the exterior of the aircraft, then this situation is considered as a loss of power to the environment. If the reflected wave travels only until it impinges the next interface, which may be the surface of the layer or the surface of the filler therein often producing an internal reflection, then there is a loss of power.

In the first layer 20, the percent of internal reflection, assuming an equal volume and shape, based on impinging particulates, there is a relatively high refection (around 81% for aluminum, 86.30% for lead, and even higher for tungsten), and the reflected wave doesn't move far before impinging another high impedance particulate. With each impingement, energy is dissipated as a transmitted wave is refracted, imparting heat to the particulate. As the reflected wave moves through the polymeric rubbery material, it is also converted to heat because of the frictional movement of the rubber molecules. Their movement is caused by the force (pressure) of the impulse. An example of the effect of a couple of materials may be seen in a comparison of aluminum and stainless steel. Assuming that the rubber has an impedance of ~1,810,000 Rayl and the aluminum has an impedance of ~17,000,000 Rayl, about 81% of the acoustic wave is reflected and 9% is transmitted. After three internal reflections, the acoustic wave has been attenuated about 2.78 dB, converting a portion of the acoustic wave into heat from the friction and shear generated by the acoustic wave in the rubbery media impinging the aluminum particulate from the reflections alone. At the high end of high impedance materials suitable for marine applications is stainless steel, having an impedance of ~56,680,000 Rayl. It reflects close to about 95%, and after three reflections there has only been an attenuation of around 0.83 dB.

As previously noted, the rubber dampening material absorbs acoustic waves, which because of its softness causes absorbance and attenuation of acoustic waves. This characteristic is especially true for acoustic waves in water. It is anticipated that other components, such as seats, walls and bulkheads within the aircraft could be fitted with soft materials like the rubber dampening material, where these other components will then serve as impulse energy sinks.

The viscous lensing medium 30 is situated between the first layer and the second layer of dampening material, where the viscous lensing medium wets the surface of both the first layer 20 and the second layer 40 of dampening material. As shown in FIG. 1, the viscous lensing medium is widthwise hemicylindrical and lengthwise elongate extending into the plane of the paper. The medium is a liquid with a high boiling point. An example is a silicone liquid heat transfer medium, which has a low freezing point, a high boiling point, and that is substantially inert and non-toxic. One example is Syltherm 800®, a product of Dow chemical. Syltherm 800® is a highly stable, long-lasting heat transfer silicone fluid designed for high temperature liquid phase operation. It exhibits a low potential for fouling and may often remain in service for 10 years or more at 400° C. (750° F.). Syltherm 800® has essentially no odor and is low in acute oral toxicity. Silicones fluids have an acoustic impedance of ~1,100,00 Rayl. Fluorosilicone fluids, for example Dow Corning FS-1265®, have very good thermal stability over a wide temperature range, and therefore could also be used, but fluorosilicones have a high density (~8.9 g/cc) and, therein, are usually less desirable for this reason. Other examples of silicone fluids made by Dow Corning include DC-200®. DC-200® is available in a number of viscosities, and a blend of DC-200® and other silicones may be used. The viscous lensing medium may contain relatively small amounts of acoustic impedance particulate 87 for example a porous sintered material, to increase the acoustic dampening properties. The viscous lensing medium's impedance (~1,100,000 Rayl) closely matches the impedance (~1,810,000 Rayl) of the rubbery material of the first and second layer of dampening media, and greater than 75% of an impinging acoustic wave will be transmitted into the viscous lensing medium.

Figure 4:
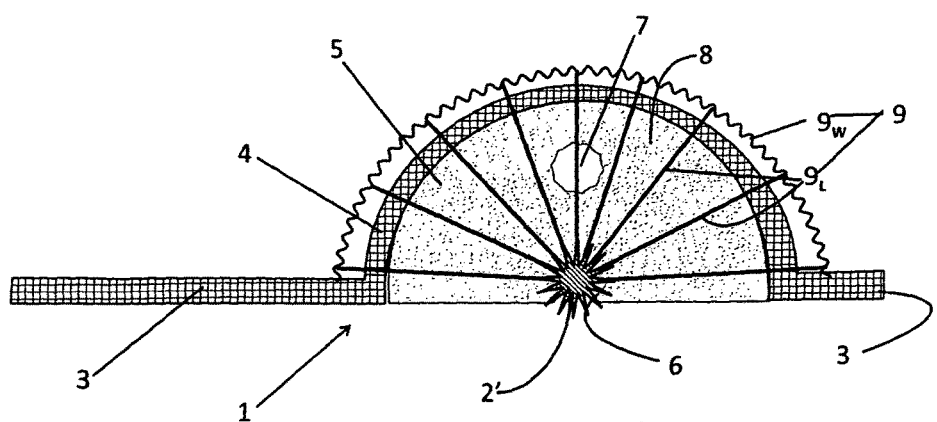
FIG. 4 is a widthwise cross-sectional view of a conventional art emergency egress system, wherein the view graphically illustrates a widthwise component and a lengthwise component of an acoustic wave emitted from the emergency egress system when the explosive charge is actuated.

The acoustic wave generated by the explosion of the elongate charge 2' of the emergency egress system is graphically illustrated in FIG. 4. The acoustic wave 9 has at least two vectorial components, a widthwise component $9_w$ and a lengthwise cross-sectional component $9_L$. The acoustic wave 9 is the remains of the partially attenuated explosive pressure wave that exits from the retainer's trough 4. The lengthwise component $9_L$ is in the plane of the paper, produced by the length of the detonation chord explosion 2', and this initial acoustic wave is graphically represented with the nine gradient lines (e.g., spokes). The widthwise component $9_W$ is graphically represented in the cross-sectional view as a sinusoidal semi-circular line. The amplitude is informally selected to indicate the energy of the wave. The retainer 3 and the charge holder 8 with groove 6 shapes and absorbs the explosive impulse so that it is partially directed to the exterior. Even so, if the aircraft is submerged or partially filled with water, the actuation of the emergency egress system is potentially lethal to the crew. In water, and in contrast to air, the acoustic wave 9 is efficiently transmitted from the water and absorbed by a human's body, therein destroying organs and cells.

Figure 5:
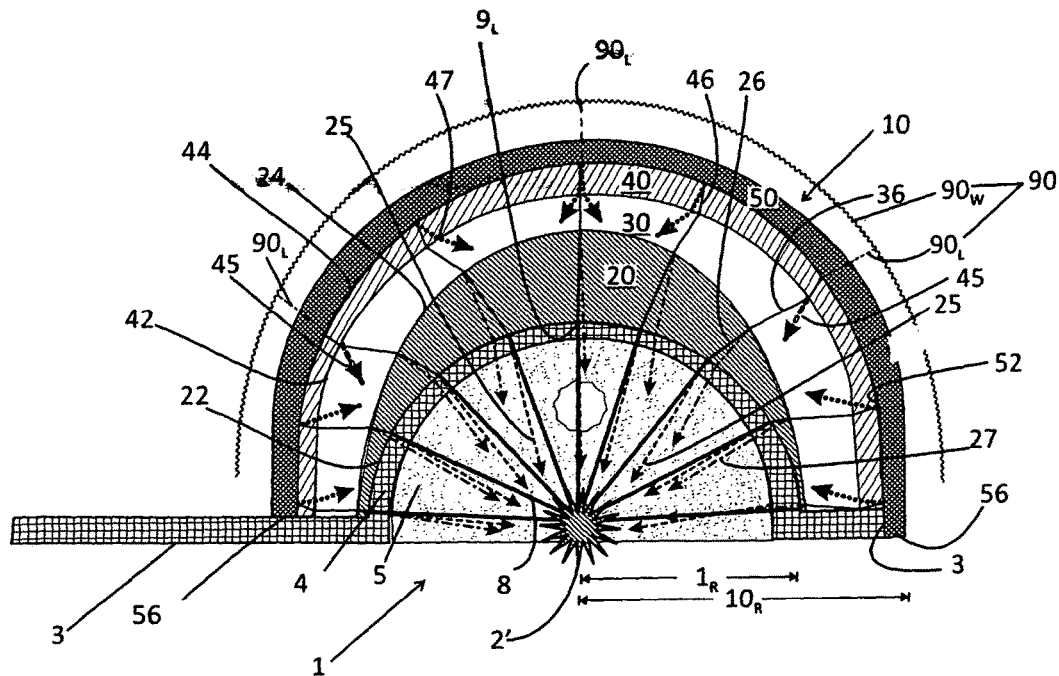
FIG. 5 is a widthwise cross-sectional view of an impulse dampening system fitted on an emergency egress system, wherein the view graphically illustrates a widthwise component and a lengthwise component of an attenuated acoustic wave emitted from the impulse dampening system when the explosive charge of the emergency egress system is actuated.

Referring to the impulse dampening system 10 in FIG. 5, the acoustic wave 9 generated by the explosion of the elongate charge 2' of the emergency egress system 1 is attenuated by hundreds of orders of magnitude. The attenuated acoustic wave 90 has at least two vectorial components, a widthwise component $90_W$ and a lengthwise component $90_L$. The lengthwise component $90_L$ is in the plane of the paper, following the path of the detonation chord explosion 2', and the widthwise component $90_W$ is represented in the cross-sectional view as a sinusoidal semi-circular line. The amplitude is graphically selected to indicate the attenuated energy of the acoustic wave 90 exiting the hard shell 50. The acoustic wave impinges and is dissipated by multiple soft elements 20,30,40, which are protected by the hard shell 50. The hard shell 50 is semi-cylindrical, and its side edges 56 generally contact with the retainer 3.

The transmitted wave exits from the first layer 20, bent by the crescent shape to the left and right into the viscous lensing media, spreading out the impulse pressure of the acoustic wave. The spreading dissipates the intensity of the impulse, and the acoustic wave energy. The transmitted wave from the first layer 20 is estimated to attenuate the power by at least 9 dB. Additional attenuation can be attributable to the movement through the viscous lensing medium 30 toward the second layer 40, and this attenuation is estimated to be at least 2 dB. Another 7 db is lost as the acoustic wave moves into the second layer 40.

The second layer 40 of dampening media is lengthwise elongate and widthwise semicircular. In the illustrated embodiment the second layer of dampening media has a thickness that is substantially uniform. The second layer of dampening media 40 is supported by the hard shell of the impulse dampening system. The second layer 40 has a composition that includes a polymeric rubbery material containing a low acoustic impedance particulate filler, where the low acoustic impedance particulate filler optimally approaches the impedance of air, which is ~415 Rayl. For purposes of defining low impedance, a low impedance is less than about ~1,100,000 Rayl. Specific examples of low acoustic impedance particulate include glass microspheres, ceramic microspheres, plastic microspheres, microballoons, hollow micro-tubes, hollow micro-fibers, hollow grains, sintered glass, and micro-bubbles of a gas. In one variation, the low acoustic impedance particulate is admixed with the polymeric rubbery material, which is then molded as a substantially uniform layer and bonded to the inside of the semi-cylindrical hard shell 50 of the impulse dampening system. Generally, the polymeric rubbery material selected for the first layer may also be employed in the second layer of dampening media 40. The first layer 20 may contain both high and low impedance particulate filler admixed with polymeric rubbery material. In the illustrated embodiment, the polymeric rubbery material is selected from the group that includes a silicone rubber, a polyurethane or a polyester rubber.

The inventor anticipates that polyurethane is known to produce hydrogen cyanide upon thermal degradation. Hydrogen cyanide is formed during the incomplete combustion of nitrogen-containing polymers, such as certain plastics, polyurethanes, and wool. Therefore, even though the heats generated by the emergency egress system would not reach these temperatures, other events precipitating the need for an emergency egress might produce sufficient temperatures to cause incomplete combustion. The specific selection of the polymeric rubbery material takes into consideration the possible ambient conditions into account. RTV silicones are used in the emergency egress system, and they have a successful track record.

Returning to the second layer of dampening media 40, the addition of low acoustic impedance particulate filler in the second layer of dampening media provides multiple internal interfaces, and therein the possibility for multiple reflections of the acoustic wave moving within the filled rubbery material. Many of the low acoustic impedance particulates have an impedance approaching air (~415 Rayl), and there is an impedance mismatch with the rubber material, and the reflectance is close to ~99% for any given single incident ray. The reflected waves bounce around internally, and the impulse energy of the reflected wave attenuates as it moves through the relatively absorptive rubber in the second layer. The attenuation of the second layer 40 is estimated to be greater than ~4 dB.

Eventually, some of the reflected acoustic waves will impinge the inside of the semi-cylindrical hard shell 50. These waves are nearly totally reflected, on the order of ~94.7%, in part as the hard shell is composed of stainless steel. Stainless steel has a very high impedance, and therefore it is an impedance mismatch for the polymeric rubbery material. The anticipated impedance of the stainless steel is ~56,680,000 Rayl, while silicone rubber is ~1,810,000 Rayl. It is estimated that about only about 5.3% of the acoustic wave will be transmitted, and this wave is largely refracted into heat. Very little of this energy (~0.2 dB) would actually be conveyed from the hard shell into to water in contact with the hard shell, in part because the impedance of saltwater (1,540,000 Rayl) is low compared to stainless steel (56,680,000 Rayl). Also, in a hard metal like stainless steel, sound moves at 6100 m/sec, which is about 60 times as fast as in rubber and about 4.5 faster than in water. Most of the remaining energy of the acoustic wave literally moves longitudinally to the edges 56 of the semi-cylindrical hard shell 50. An approximate estimate of the total attenuation lost as heat and dissipated sound through the edges 56 to the emergency egress retainer. The retainer is generally fastened proximate to the skin of the aircraft. The estimated attenuation of the acoustic energy by the hard shell is ~10 dB. A fraction of the amplitude of the original energy remains, that is, less than 0.05% of the initial acoustic wave 9. There is a large impedance mismatch of the hard shell and water, and therefore very little of the remaining energy may be transmitted to ambient water as an acoustic wave. It is estimated that the attenuated impulse dampened acoustic wave 90 is less than ~0.05% of the original acoustic wave 9 from the emergency egress system 1 that is transmitted to the salt water. This attenuation is due, in part, because of the impedance mismatch with water but for the larger reason that the original impulse from the emergency egress has either been reflected back away from the aircraft or converted to friction and heat.

The cumulative attenuation of the impulse dampening system is estimated to be at least ~33 dB, alternatively stated the acoustic wave is reduced by a factor in excess of 3000. Table 2 in FIG. 6 summarizes where the acoustic power is lost.

As shown in the cross-sectional views in FIG. 1, FIG. 3 and FIG. 5 the two dampening layers 20, 40 each have a surface wetted by a viscous fluid lensing media. The widthwise crescent shape of the first layer 20 provides a lobe-like thicker portion that, includes a semi-elliptical surface 24 and a semi-circular surface 22. As the acoustic wave moves from the emergency egress retainer trough 4 toward the first layer 20, the wave will initially encounter the semi-circular surface 22. The semi-circular surface 22 is concave, and reflected waves will move back toward the emergency egress retainer trough 4, and outside of the aircraft. The reflected acoustic wave 25 is illustrated as a dashed line (---) in FIG. 5. Reflected waves from the semi-elliptical surface are numbered 27 and the have a dash-dot-dash arrow lines (-•-) as shown in FIG. 5 The first layer reflects about 30% (~1.5 dB) of the incident wave 9 based on the impedance of the fiberglass retainer trough 4, where fiberglass has an impedance of ~6,040,000 Rayl and the polymeric rubbery material, generally a silicone rubber, has an impedance 1,810,000 Rayl. The first transmitted acoustic wave 26 that emerges travels through the crescent shaped dampening media, and as it progresses more energy is lost to the media, as both the rubber and impedance particulates absorb energy. The energy loss is estimated to be ~7 db. The first transmitted acoustic wave 26 is depicted as traveling in a straight line, but it is probable that the first transmitted acoustic wave 26 will impinge the multiple particulates, which produce reflection and secondary transmitted waves, Both reflection and the secondary transmittal waves serve as a mechanism for attenuating the power, and scattering.

The radius 10R of the impulse dampening system 10 is larger than the radius 1R of the emergency egress system 1, and thus increases the volume by a factor of 2.8. The small change in radius has not been considered in estimating the attenuation. Assuming the radius of the emergency egress system 5, an attenuation of about 0.5 dB or higher may be attributed to the increased radius. The larger the radius then the larger the attenuation.

Ultimately the first transmitted acoustic wave 26 will encounter the semi-elliptical surface 24 of the first layer 20. The semi-elliptical surface 24 provides a narrower incident angle and is more probable of being transmitted as the second transmitted acoustic wave 36 into the viscous lensing fluid 30. The impedance of the fluid is generally a silicone fluid having an acoustic impedance of 1,100,000 Rayl, which is close to the first layer rubbery dampening media providing low reflectance. Approximately 80% is transmitted as the second transmitted wave to the second layer 40. As previously discussed, the fluidity provides excellent wetting, and the hemi-cylindrical shape of the cavity occupied by the viscous lensing fluid 30 enables good dissipation of heat, as both the first and second layers are in contact. Reflected wave 25 is reflected from the semi-cylindrical surface 22 and reflected wave 27 is reflected from the semi-elliptical surface 24 of the first layer 20. The attenuation of crossing into the viscous layer is about ~1 dB and approximately about another ~1 dB moving into the second layer. About ~7 db will be dissipated in viscous layer 30.

Some of the second transmitted waves will reach the inside surface 42 of the second layer 40 and either be transmitted as the third transmitted wave 46 or be reflected back to the viscous medium 30 as reflected wave 45 graphically represented as a line of circles (oooo). The third transmitted wave 46 travels impinging the low particulate filler and the rubbery medium. A portion will eventually reach the outside surface 44 of the second layer 40, which is flush with the inside surface 52 of the hard shell 50. At this interface, most of the remaining impulse is reflected as reflected wave 47 graphically represented as a line of heavy dots (∞∞∞∞). An attenuation of about ~4 dB is loss because the low impedance particulates produce multiple internal reflections.

Reflected waves, moving back toward the exterior of the aircraft see the layers as having a convex surface, and as such the incident wave must be closer to normal before the acoustic wave is transmitted. Many incident waves will have an angle that is too wide, and will reach the critical angle. At the critical angle a wave essentially skips along the surface of the layers. The reflected waves may become essentially trapped in the viscous lensing media 30, where they dissipate as heat.

The loss of energy due to low impedance particulate in the second layer creates greater internal reflection within the second layer, and therefore further attenuation. As shown above, even if only a small percentage of the energy of the acoustic wave is converted into a transmitted wave, cumulatively this loss in energy becomes heat, and the impulse energy of the acoustic wave is reduced. The heat capacity of the dampening media of the second layer may be increased by adding a high acoustic impedance particulate that has a higher heat capacity than the polymeric rubbery material. An example of high acoustic impedance particulate with a higher heat capacity is a metal, for example aluminum. The specific heat of aluminum is ~0.9 J/g° C., while silicone rubber is ~1.42 J/g° C., but aluminum's density is 2.72 g/ml, while silicone rubber's density is 1.47 g/ml. Therefore, for one milliliter, the heat capacity of aluminum is 2.43 Joules, while silicone rubber is slightly less at 2.10 Joules. The second layer of dampening media may include both high and low acoustic impedance particulate to increase the overall attenuation and heat capacity.

Low acoustic impedance particulates may be added to the first layer of dampening media to enhance the internal reflection. However, low acoustic impedance particulates generally do not have a higher heat capacity than the polymeric rubber material. Generally, the heat capacity of the low acoustic impedance particulates is less than the high impedance particulates so internal reflection increases but the total heat capacity of the dampening media is reduced. The composition of the dampening media is optimized to enhance attenuation.

Referring to Table 2, the interface between the inside surface 52 of the hard shell 50 and the outside surface 44 of the second layer 40 can produce a large attenuation, estimated to be in excess of 10 dB. The large drop is because the impedance difference is very high. Stainless steel is ~56,680,000 Rayl, while silicone rubber is ~1,810,000 Rayl steel, so reflection is high, on the order of 94.7%. Accordingly, only about 5.3% of the remaining energy of the acoustic wave is transmitted. The continuing wave that actually makes it through the hard shell and into the water is only about ~2%. This number has been adjusted upward to ~5% to account for possible refracted waves that were not loss in the second layer, the multiple reflected waves trapped between the concave hard shell and the convex surface the outside surface 44 of the second layer 40; and the rarerefraction (e.g., destructive interference) of reflected waves. Considering these factors, there is an estimated attenuation that is less than about ~0.3 dB due, in large part, because the wave's power is already highly attenuated.

As discussed earlier, the hard shell is made of a metal, for example stainless steel, and sound moves at 6100 m/sec, which is about 60 times as fast as in rubber and about 4.5 faster than in water. Most of the remaining energy of the acoustic wave literally moves longitudinally to the edges 56 of the semi-cylindrical hard shell 50. Sound energy is conveyed toward the edges 56 of the longitudinal ends (not shown) of the hard shell. In the case of the edges 56, both are curved around such that sound emanating from the edges will be focused away from the aircraft. Sound also may emanate from the ends, unless as shown in FIG. 2 the impulse dampening system has no ends.

The attenuation by the impulse dampening system of the acoustic wave 9 emanating from an emergency egress system, where the acoustic wave 9 is generated by an actuated exploding charge, estimated to be about ~35 db. The resulting attenuated acoustic wave 90 has an impulse in water that is comparable to the impulse in air of an emergency egress system that is not fitted with the impulse dampening system. The invention enables emergency egress from aircraft submerged in water, as well as air.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. An emergency egress system of an aircraft including an impulse dampening system,
    comprising:
    an outer hard shell,
        wherein the outer shell includes at least one section that is a semi-cylindrical shape in a widthwise dimension and an elongate shape in a lengthwise dimension;
    a set of softer elements for absorbing sound that is contained within, protected by, and largely supported by the outerhard shell,
        wherein said softer elements is comprised of a
    first layer of dampening media,
    a second layer of dampening media, and
    a viscous lensing medium,
        wherein said first layer of dampening media includes a widthwise dimension where a cross section along the widthwise dimension is crescent shaped with an outer semi-elliptical shaped surface and an inner semi-circular shaped surface,
        wherein said second layer of dampening media is mounted to an interior surface of the semi-cylindrical shape of the section of the hard shell,
        wherein in the viscous lensing medium is situated between the first layer and the second layer,
        wherein the emergency egress system includes the impulse dampening system is dimensioned so that it overlaps and encloses a semi-cylindrical trough of a retainer of the emergency egress system of the aircraft,
    wherein the semi-cylindrical trough includes a rubber charge holder and an explosive charge,
    wherein said first layer of dampening media is comprised of
        a polymeric rubbery material, and
        at least a filler comprised of a high acoustic impedance particulate,
    wherein said second layer of dampening media is comprised of
        a polymeric rubbery material, and
        at least a filler comprised of a low acoustic impedance particulate,
    wherein an impedance mismatch exists between a first impedance of the polymeric rubber material of the second layer and a second impedance of the low acoustic impedance particulate, and
    wherein the viscous lensing medium includes acoustic impedance particulates to increase acoustic dampening properties of the system.

2. The system according to claim 1,
    wherein the high acoustic impedance particulate is dispersed in the polymeric rubbery material,
    wherein a high acoustic impedance is defined as having an acoustic impedance greater than 1,540,000 Rayl, which is an acoustic impedance of seawater, and
    wherein the particulate provides multiple internal interfaces, and therein a possibility for multiple reflections of an acoustic wave moves within the polymeric rubbery material, which is filled.

3. The system according to claim 2, wherein said high acoustic impedance particulate includes a range of multiple sizes and shapes selected from a group consisting of at least one of small flakes, small porous sintered grains, snail pastilles, spheres, fines, small granules, and powders.

4. The system according to claim 2, wherein said high acoustic impedance particulate is generally composed of at least one of a metal and a metal alloy.

5. The system according to claim 2, wherein said first layer is further comprised of a low acoustic impedance particulate.

6. The system according to claim 2, wherein an attenuation of the acoustic wave, which emanates from the emergency egress system, is at least about 35 dB.

7. The system according to claim 1,
    wherein the low acoustic impedance particulate is dispersed in the polymeric rubbery material,
    wherein a low acoustic impedance is defined as having an acoustic impedance less than about 1,100,000 Rayl, where an acoustic impedance of air is about 415 Rayl, and
    wherein the particulate provides multiple internal interfaces, and therein a possibility for multiple reflections of an acoustic wave moves within the polymeric rubbery material, which is filled.

8. The system according to claim 7, wherein said low acoustic impedance particulate is selected from a group consisting of at least one of glass microspheres, ceramic microspheres, plastic microspheres, microballoons, hollow micro-tubes, hollow micro-fibers, hollow grains, sintered glass, and micro-bubbles of a gas.

9. The system according to claim 7, wherein said second layer is further comprised of a high acoustic impedance particulate.

10. The system according to claim 1, wherein said viscous lensing medium is comprised of a stable liquid with a boiling point greater than 300° C., wherein the stable liquid is an inert material with a freezing point lower than about −40° C., and wherein the stable liquid is a nontoxic material with an acoustic impedance close to a silicone rubber material.

11. The system according to claim 10, wherein said viscous lensing medium is a heat transfer silicone fluid.

12. The system according to claim 10, wherein said viscous lensing medium is further comprised of an acoustic impedance particulate.

13. The system according to claim 1, wherein said hard shell is comprised of one of a metal and an alloy with a high acoustic impedance.

14. The system according to claim 1, wherein said semi-cylindrical hard shell includes a speed of sound property higher than a speed of sound property of the second layer and multiple times higher than a peed of sound in seawater,
   wherein said semi-cylindrical hard shell is a concave shape terminating in a pair of edges so that a higher portion of energy is reflected toward an exterior compared to a lower portion of energy lost from the pair of edges aligned with the exterior, and
   wherein a negligible amount of impulse energy is transmitted to water in an interior of an aircraft, where the water is in contact with the hard shell.

15. The system according to claim 1, wherein said hard shell is comprised of stainless steel.

16. An emergency egress system of an aircraft including an impulse dampening system, comprising:
   an outerhard shell, wherein the outer shell includes at least one section that is a semi-cylindrical shape in a widthwise dimension and an elongate shape in a lengthwise dimension; and
   a set of softer elements for absorbing sound that is contained within, protected by, and largely supported by the outer hard shell,
      wherein said softer elements is comprised of a first layer of dampening media, a second layer of dampening media and a viscous lensing medium,
      wherein said first layer of dampening media includes a widthwise dimension where a cross section along the widthdwise dimension is crescent shaped with an outer semi-elliptical shaped surface and an inner semi-circular shaped surface,
      wherein said second layer of dampening media is mounted to an interior surface of the semi-cylindrical shape of the section of the hard shell,
      wherein in the viscous lensing medium is situated between the first layer and the second layer,
   wherein the emergency egress system includes the impulse dampening system is dimensioned so that it overlaps and encloses a semi-cylindrical trough of a retainer of the emergency egress system of the aircraft,
      wherein the semi-cylindrical trough includes a rubber charge holder and an explosive charge,
      wherein an initial acoustic wave emanates from the semi-cylindrical trough and moves toward the hard shell addressing a set of soft elements as a concave shape,
      wherein a returning reflected acoustic wave addresses the se of soft elements as a convex shape, where the acoustic wave impinges a concave surface with a narrower angle of incidence than when impinging a convex surface, and therefore is transmitted,
   wherein the initial acoustic wave is at least partially trapped within the soft elements, which converts impulse energy of the initial acoustic wave into heat energy,
   wherein said first layer of dampening media is comprised of a polymeric rubbery material and at least a filler comprised of a high acoustic impedance particulate,
   wherein said second layer of dampening media is comprised of a polymeric rubbery material and at least a filler comprised of a low acoustic impedance particulate,
   wherein an impedance mismatch exists between a first impedance of the polymeric rubber material of the second layer and a second impedance of the low acoustic impedance articulate, and
   wherein the viscous lensing medium includes acoustic impedance particulates to increase acoustic dampening properties of the system.

* * * * *